United States Patent
Okuwaki

(10) Patent No.: US 7,517,130 B2
(45) Date of Patent: Apr. 14, 2009

(54) PLANAR LIGHT SOURCE UNIT

(75) Inventor: Daisaku Okuwaki, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 21 days.

(21) Appl. No.: 11/337,837

(22) Filed: Jan. 24, 2006

(65) Prior Publication Data

US 2006/0181903 A1 Aug. 17, 2006

(30) Foreign Application Priority Data

Jan. 24, 2005 (JP) ............................ P2005-014918

(51) Int. Cl.
*F21V 7/04* (2006.01)

(52) U.S. Cl. ...................... 362/620; 362/339

(58) Field of Classification Search ................ 362/558, 362/26, 27, 244, 246, 330, 333, 339, 559, 362/561, 619, 620, 623, 625, 626; 349/64, 349/65, 69, 70; 359/639, 640; 385/901; 40/546, 547

See application file for complete search history.

(56) References Cited

U.S. PATENT DOCUMENTS

| | | | |
|---|---|---|---|
| 6,151,169 A * | 11/2000 | Kim | 359/640 |
| 6,347,873 B1 | 2/2002 | Hosseini et al. | |
| 6,612,710 B2 * | 9/2003 | Suzuki et al. | 362/600 |
| 6,921,178 B2 * | 7/2005 | Ohkawa | 362/620 |
| 6,991,358 B2 * | 1/2006 | Kokogawa | 362/619 |

FOREIGN PATENT DOCUMENTS

| | | | |
|---|---|---|---|
| JP | 2001155520 A * | 6/2001 | |
| JP | 2002231029 A * | 8/2002 | |
| JP | 2003-337333 A | 11/2003 | |

* cited by examiner

*Primary Examiner*—Hargobind S Sawhney
(74) *Attorney, Agent, or Firm*—Browdy and Neimark, P.L.L.C.

(57) ABSTRACT

A planar light source unit including a light guiding plate (1) having an anisotropic diffusing surface (1h) which emits anisotropic diffusion light, and a light emitting source (2) for supplying light to the light guiding plate, the anisotropic diffusing surface being formed into a shape configured to give a gradation of the anisotropic diffusion light intensity.

6 Claims, 15 Drawing Sheets

PLANAR LIGHT SOURCE UNIT

CROSS-REFERENCE TO THE RELATED APPLICATION

This application is based on and claims the priority benefit of Japanese Patent Application No. 2005-14918 filed on Jan. 24, 2005, the disclosure of which is incorporated herein by reference in its entirety.

BACKGROUND OF THE INVENTION

1. Field of the Invention

The present invention relates to a planar light source unit used as a backlight for illuminating a display such as a liquid crystal display (LCD) panel from back surface thereof.

2. Description of Related Art

There have been known backlight devices comprising planar light source units as means for illuminating LCD panel or the like used in mobile terminal devices, laptop type computers or the like.

This kind of planar light source unit has a structure as shown in FIGS. 22A to 22C (see, for reference, Japanese Patent Laid-Open 2003-337333, FIG. 17).

As shown in FIGS. 22A and 22B, the planar light source unit 120 includes a light guiding plate 101 having upper and lower surfaces 101a and 101b, LEDs 102 acting as light emitting sources, a diffusing plate 103, a Py prismatic sheet 104, a Px prismatic sheet 105, and a reflective plate 106. Here, reference number 107 shows a transmissive or semi-transmissive type LCD panel to be illuminated by the planar light source unit 120.

The LEDs 102 are held on an LED substrate 102b to face an incident surface 101c of the light guiding plate 101, and the diffusing plate 103, the Py prismatic sheet 104, and the Px prismatic sheet 105 are disposed to be laminated on the light guiding plate 101 sequentially. The reflective plate 106 is disposed close to and to face the lower surface 101b of the light guiding plate 101.

Light emitted from the LEDs enters the light guiding plate 101 through the incident surface 101c. The entered light is transmitted within the light guiding plate 101 while undergoing repeated reflection between the upper and lower surfaces 101a and 101b and emitted from the upper surface 101a during this repeated reflection. The lower surface 101b is formed from a finely corrugated diffused reflection surface or prisms. The internal light in the light guiding plate 101 is partly reflected on the diffused reflection lower surface 101b to be directed to the upper surface 101a and partly emitted from the diffused reflection lower surface 101b to be directed to the reflective plate 106 by reflection and refraction of light. The reflective plate 106 reflects the light emitted downwardly by refraction through the lower surface 101b to return the reflected light to the interior portion of the light guiding plate 101, thereby enhancing utilization efficiency of light.

The light emitted from the upper surface 101a of the light guiding plate 101 reaches the diffusing plate 103, and a direction of the light is adjusted to some extent toward the LCD panel. Furthermore, light having an angle toward y-axial direction (see coordinate axes x, y and z in FIG. 22A) is adjusted by the Py prismatic sheet 104, light having an angle toward x-axial direction is adjusted by the Px prismatic sheet 105, and light emitted from the Px prismatic sheet 105 is finally aligned in generally parallel to z-axial direction. The light aligned parallel to z-axial direction enters the LCD panel 107 to provide an ideal state of light passing through the LCD panel, whereby enabling a clear display having a high SN (signal-noise) ratio.

However, the above-mentioned planar light source unit has problems as follows.

Because light is reflected in all directions on the lower surface 101b, much light enters the upper surface 101a at an angle near to a critical angle as shown in FIG. 22C. The light refracts at an angle which is close to 90° to a normal line of the upper surface 101a, in other words at an angle which is close to the horizontal direction. In this case, the light may not reach the diffusing plate 103, or, even if it does reach, because of a large incident angle, it is difficult to change the directions of light and to direct light from the diffusing plate 103 into the Py prismatic sheet 104. In this way, on the whole, there is a problem that it is difficult to adjust the directions of the light emitted from the LEDs 102 and to direct the light for illuminating a display effectively.

Therefore, to improve this problem, a planar light source unit using a light guiding plate 101 provided with an optically anisotropic diffusing surface 101h generating hologram diffusion or hairline diffusion has been used. In the planar light source unit, a plurality of prisms are provided on the lower surface 101b of the light guiding plate 101. In other respects, the structure is generally the same as for the planar light source unit 120 shown in FIG. 22A. This kind of technology uses, for example, a known principle shown in page 5 of the specification of U.S. Pat. No. 6,347,873 B1.

More specifically, an anisotropic diffusing surface 101h similar to a predetermined hologram is formed on the upper surface 101a of the light guiding plate 101 (including a case that an incident angle of light to the anisotropic diffusing surface 101h is near to a critical angle) to allow cone-shaped diffusion light $\phi 01$ having a desired angle other than the exit angle of 90° (horizontal direction) to be emitted from the anisotropic diffusing surface 101h. In this way, it is possible to improve on the problem caused when a large incident angle is set relative to the diffusing plate 103 shown in FIG. 22C, increase the utilization efficiency of light entering the diffusing plate 103, and increase brightness of illuminating rays.

To briefly state the principle, the diffusion surface 101h is, for example, formed into hologram, to reproduce diffusion light rays which is object light having incident angles within a predetermined angular width when internal light rays having incident angles within a predetermined angular width enter the light guiding plate as reference light rays. The internal light is emitted upward from the light guiding plate 101 as diffusion light rays $\phi 01$ having incident angles within a predetermined angular width range by being reflected on one or more times on prisms provided on the lower surface 101b.

Here, the predetermined incident angular width to be diffusion light rays $\phi 01$ depends on a surface state. Even if the surface is formed into a concave state, convex state, or whatever of the diffusing surface, if the surface state is constant, the incident angular width of light rays is also constant regardless of the position of the surface.

Here, the anisotropic diffusion light is emitted with diffusion larger in a width direction (y-axial direction) perpendicular to a sectioned direction (B-B direction) in FIG. 23B than the sectioned direction in a sectional plane of the diffusion light $\phi 01$, as shown in FIG. 23C. In other words, the diffusing surface 101h has an anisotropic diffusing surface having high diffusion property in the width direction (y-axial direction).

On the other hand, there is an internal light deficiency area on the upper surface of the light guiding plate 101 corresponding to the space between adjacent LEDs 102 and positioned near the LEDs 102, to which the internal light (light emitted from the LEDs 102, entering the light guiding plate and transmitted in the light guiding plate) does not reach and no light is emitted directly from this internal light deficiency area.

Therefore, it is required that anisotropic diffusion light having a larger diffusion in the width direction (the y-axial direction parallel to the incident surface 101c) is emitted from the diffusing surface 101h in an area (light emitting area) adjacent to the internal light deficiency area.

However, even in the planar light source unit improved in this way, the following problems arise.

In the conventional light guiding plate 101 having the upper surface provided with the anisotropic diffusing surface 101h, the anisotropic property and the intensity of diffusion light are uniform throughout the whole of the light guiding plate. In other words, diffusion occurs with the same anisotropic diffusion light intensity, whether it be in a position close to the LEDs 102 or in a position remote from the LEDs 102.

By the way, in the case of such diffusion light, as the angular width of the diffusion increases, the portion of the emitted light for which the exit angle is large increases and the conversion efficiency of the entire emitted light in a perpendicular direction is reduced. That is to say, the anisotropic diffusion light intensity and the final conversion efficiency to illumination light are closely related. Therefore, in this case, the conversion efficiency is constant regardless of the place within the light guiding plate. Here, the intensity of the internal light in the light guiding plate 101 tends to be reduced with increasing distance from the LEDs 102 because a light path length increases, a solid angle decreases, and diffusion light is emitted along the way.

On the other hand, intensity or brightness of the illumination light depends on the product of the intensity of the internal light and the conversion efficiency. Therefore, the illumination light is significantly increased in a central portion of the light guiding plate 101 and a portion of the light guiding plate opposite the LEDs 102, resulting in uneven brightness of the illumination light. This occurs for the following reason.

In the central portion of the light guiding plate 101 and the portion of the light guiding plate opposite the LEDs 102, even though there are no substantial internal light deficiency areas due to the spaces between the LEDs, because the anisotropic diffusion light intensity on the anisotropic diffusing surface 101h is even throughout the entire light guiding plate, the anisotropic intensity unduly increases in the internal light deficiency areas.

SUMMARY OF THE INVENTION

An object of the present invention is to provide a planar light source unit capable of securing illumination light having sufficient intensity and uniform brightness.

To accomplish the above-mentioned object, a planar light source unit according to one embodiment of the present invention comprises a light guiding plate including an anisotropic diffusing surface which emits anisotropic diffusion light rays, and a light emitting source for supplying light to the light guiding plate.

The anisotropic diffusing surface is formed into a shape configured to give a gradation of the anisotropic diffusion light intensity.

In one embodiment, the gradation of the anisotropic diffusion light intensity is set to vary stepwise. In another embodiment, the gradation of the anisotropic diffusion light intensity is set to vary non-stepwise.

With the above-mentioned structure, it is possible to uniformize the brightness of the illumination light within the light guiding plate and increase the entire brightness level by properly varying the anisotropic diffusion light intensity on the anisotropic diffusing surface of the light guiding plate, without uneven anisotropic diffusion light intensity which occurs in conventional planar light source units. For example, in a light guiding plate, by increasing the intensity of the anisotropic diffusion light in the vicinity of the LEDs and reducing the intensity of the anisotropic diffusion light in positions remote from the LEDs, the exit angles of the diffusion light rays are adjusted to have narrower angles to a normal line of the upper surface. Consequently, light emitted from a light source can be efficiently converted to vertically illuminating rays as a backlight. In addition, it is possible to reduce the brightness variation of the illumination light and accomplish a brightness level higher than in a conventional light guiding plate by correcting the lowering brightness of the internal light according to the increment of distance from the LEDs.

DETAILED DESCRIPTION OF THE PREFERRED EMBODIMENTS

Preferred embodiments of the present invention will be explained in detail below with reference to the accompanying drawings.

FIGS. 1 to 9 illustrate a first embodiment of a planar light source unit according to the present invention.

Figure 1:
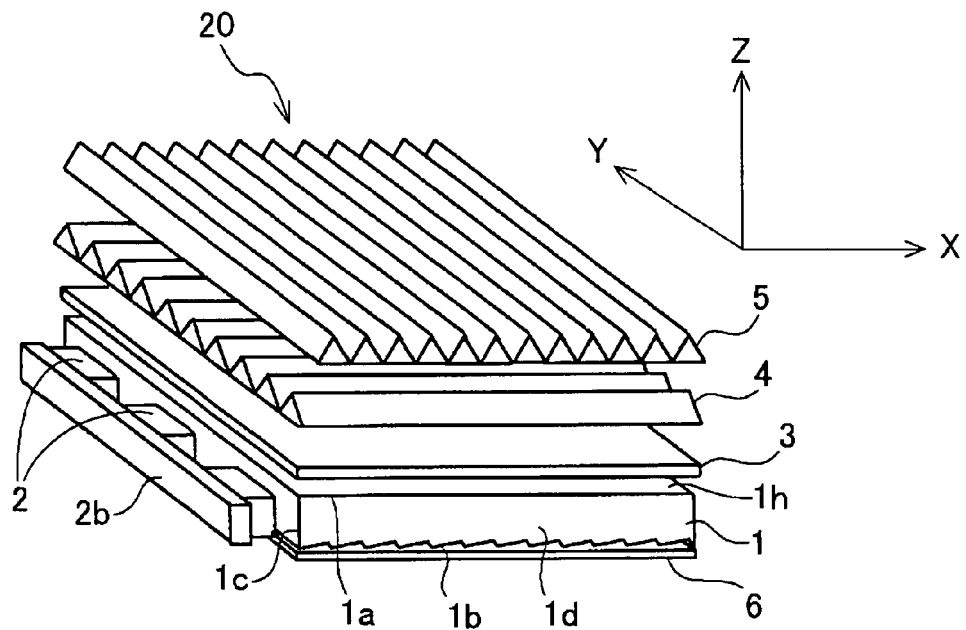
FIG. 1 is a perspective view showing a structure of a planar light source unit according to a first embodiment of the present invention.

The planar light source unit 20 in the first embodiment includes a light guiding plate 1 and a light emitting source 2 for supplying light to the light guiding plate 1, as shown in FIG. 1. The light guiding plate 1 is formed from, for example, a rectangular plate and has an upper surface 1a, a lower surface 1b, side surfaces 1c and end surfaces 1d (see FIG. 1). The light emitting source 2 comprising at least one light emitting diode (LED) is disposed to face an incident surface formed on one side surface 1c of the light guiding plate 1 in the illustrated embodiment. The LEDs 2 are attached to an LED substrate 2b and are disposed at predetermined intervals.

In the first embodiment, for example, a diffusion plate 3, a Px prismatic sheet 4, and a Py prismatic sheet 5 are laminated in turn on the upper surface of the light guiding plate 1. An object, for example, an LCD panel 7 is assumed to be set adjacent to the Py prismatic sheet to be illuminated by the planar light source unit 20 (see FIGS. 1 and 7). Moreover, a reflective plate 6 is disposed adjacent to and facing the lower surface 1b of the light guiding plate 1.

Here, when mutually perpendicular coordinate axes X, Y and Z are set, the upper and lower surfaces 1a and 1b of the light guiding plate 1 are extended parallel to the X and Y axes, the incident surface 1c is extended parallel to the Y and Z axes, and the end surfaces 1d are extended parallel to the X and Z axes.

Figure 2:
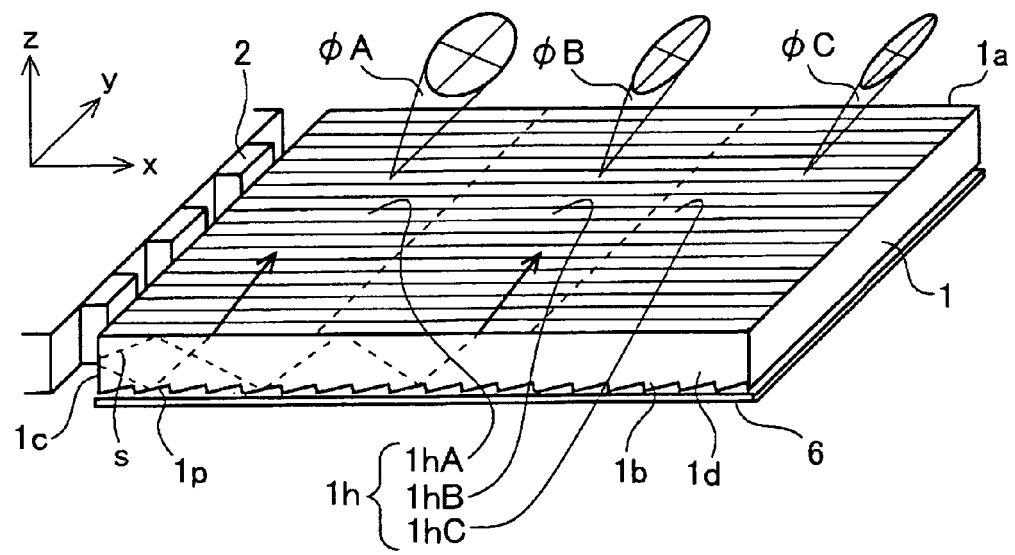
FIG. 2 is a perspective view showing a structure of a light guiding plate used for the planar light source unit shown in FIG. 1.

The light guiding plate 1 has, for example, an anisotropic diffusing surface 1h formed on the upper surface 1a (see FIG. 2). The anisotropic diffusing surface 1h comprises, for example, a hairline diffusing surface, a hologram diffusing surface or the like. The anisotropic diffusing surface 1h has more than one different texture and also, there may be a texture gradation of the anisotropic diffusing surface so that there is a high diffusion light setting at positions close to the LEDs and a low diffusion light setting at positions remote from the LEDs. In other words, the diffusion light intensity is configured to vary depending on a position of the upper surface of the light guiding plate 1.

More specifically, according to one embodiment of the present invention, the anisotropic diffusing surface 1h includes three anisotropic diffusing surface areas including first to third diffusing surface areas 1hA, 1hB and 1hC which are disposed in turn from a position close to the incident surface 1c to positions remote from the incident surface 1c.

The lower surface 1b of the light guiding plate 1 is provided with a plurality of prisms 1p which are formed to gently incline in a direction remote from the incident surface 1c (see FIG. 2).

Figure 18A:
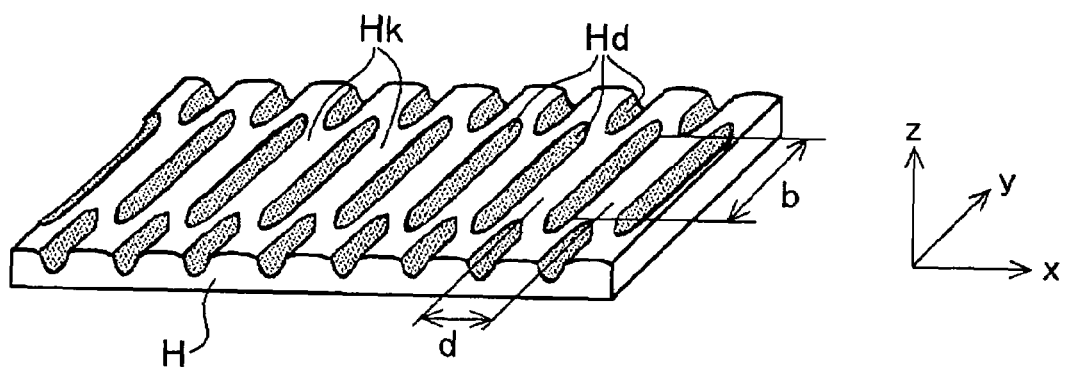
FIG. 18A is a perspective view showing one portion of an anisotropic diffusing surface composed of a hologram used for the planar light source unit according to the present invention.

A hologram records phase information of a standing wave generated by interference of object light and reference light, and the object light is reproduced as diffraction light when reference light is applied to the hologram. Of the holograms, there is one referred to as a surface relief type-hologram using a photo-resist or the like, which records phase information of interference light on a surface of the hologram as a concave and convex surface, not as concentration. The surface relief type-hologram has a configuration as shown in FIG. 18A.

More specifically, the surface relief type-hologram H includes a plurality of parallel elongate groove-shaped concave portions Hd and a plurality of generally flat convex portions Hk disposed between the concave portions Hd. As shown in FIG. 18A, the concave portions Hd extend in a y-axial direction and are arranged at intervals in an x-axial direction. In FIG. 18, a width of each of the convex portions Hk in the y-axial direction is set to be b, and a pitch of the convex portions Hk in the y-axial direction is set to be d.

Figure 18B:
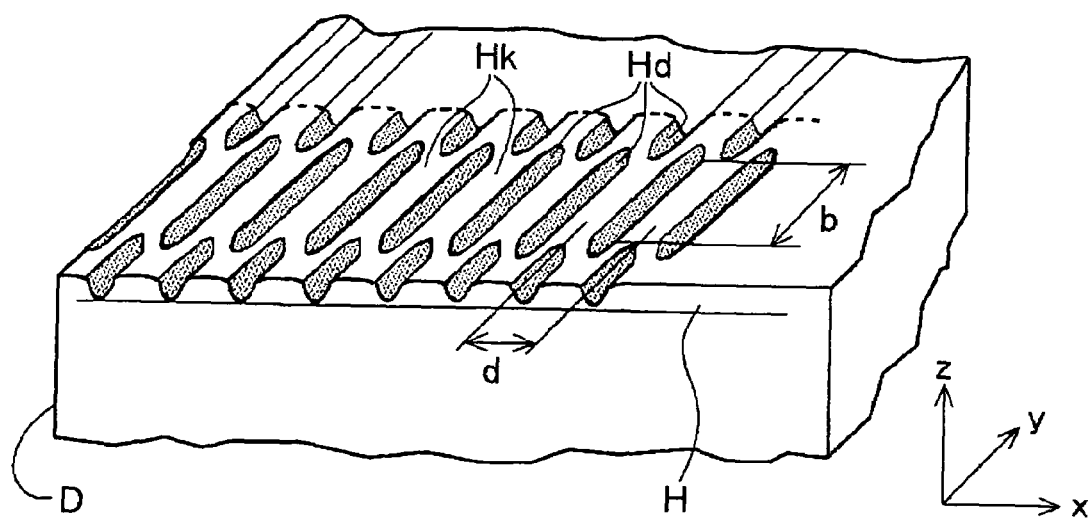
FIG. 18B is a perspective view of a state where the hologram shown in FIG. 18A is mounted on a light guiding plate.

Next, the surface relief type-hologram H can be formed on an upper surface of a light guiding plate D, as shown in FIG. 18B. The light guiding plate D can be formed by transferring a surface configuration of the surface relief type-hologram (FIG. 18A) in which the phase information corresponding to the concentration of the interference light by the photo-resist is recorded as the concave-convex surface to a metallic mold by use of, for example, a plating technology, and assembling the metallic mold in an injection metallic mold.

Here, it is assumed that internal light s corresponding to the reference light enters the hologram H at an incident angle θx in an x-z plane and at an incident angle 0° in a y-z plane. Viewed at a micro level, the internal light s is not transmitted at the concave portions of the concave-convex surface by diffused reflection but is transmitted at the convex portions. However, as viewed in the x-z plane, the transmitted light mutually interferes, and the diffusion light occurs only in a direction where the light mutually reinforces.

If an exit angle of the diffusion light in the direction of mutual reinforcement of the light is θ1x, the following equation is satisfied.

$$(\sin \theta x - \sin \theta x1) 2\pi d/\lambda = \pm \Psi \qquad (1)$$

Where λ is a wave length, Ψ is a particular phase.

Figure 19A:
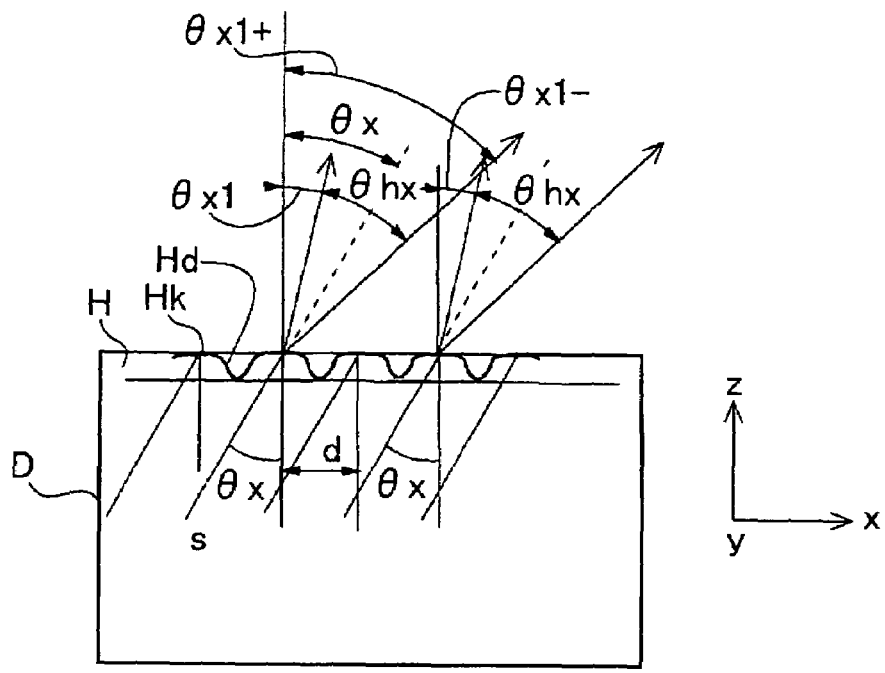
FIG. 19A is an explanatory view showing a principle of the light guiding plate shown in FIG. 18B.

From the equation (1), if Ψ is constant, a difference between the incident angle θx and the exit angle θx1 tends to become larger as the pitch d is reduced. Here, as shown in FIG. 19A, if one value of the θx1 is set at −θx1, and another value is set at +θx1, an angular width between the two is expressed as θhx. The θhx is inversely proportional to the pitch d of the convex portions, as shown in FIG. 19A.

Figure 20A:
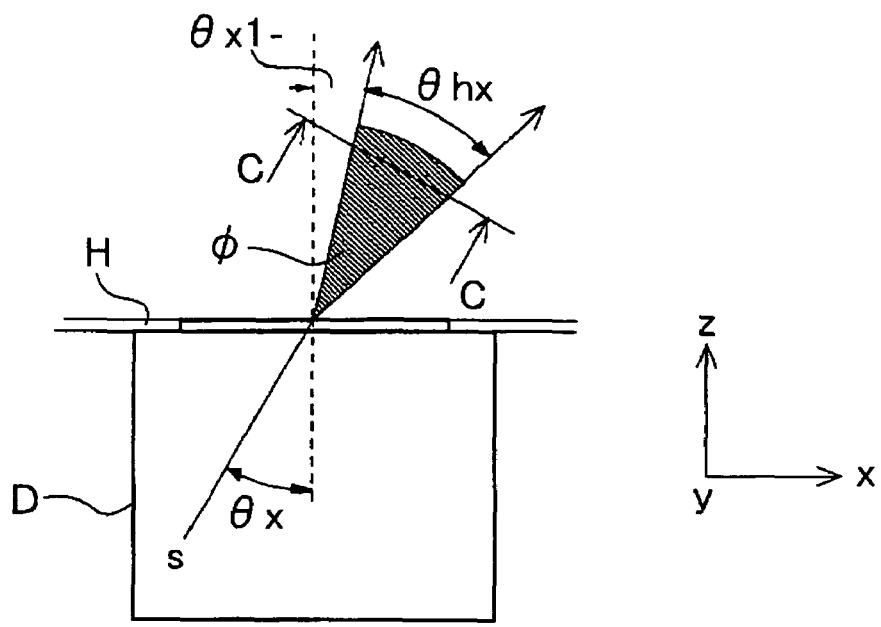
FIG. 20A is an explanatory view of the anisotropic diffusion light emitted from the anisotropic diffusing surface of the light guiding plate shown in FIG. 18B.

FIG. 20A illustrates a state in which the diffusion shown in FIG. 19A is viewed at a macro level, and a direction of the exit angle θx1 and the angular width θhx of the diffusion light φ emitted from the hologram H are viewed from the x-z plane. It is possible to separate and diffuse the exit light within a range of the angular width θhx by suitable dispersion of the value of the pitch d shown in FIG. 19A to a predetermined value or more.

Figure 19B:
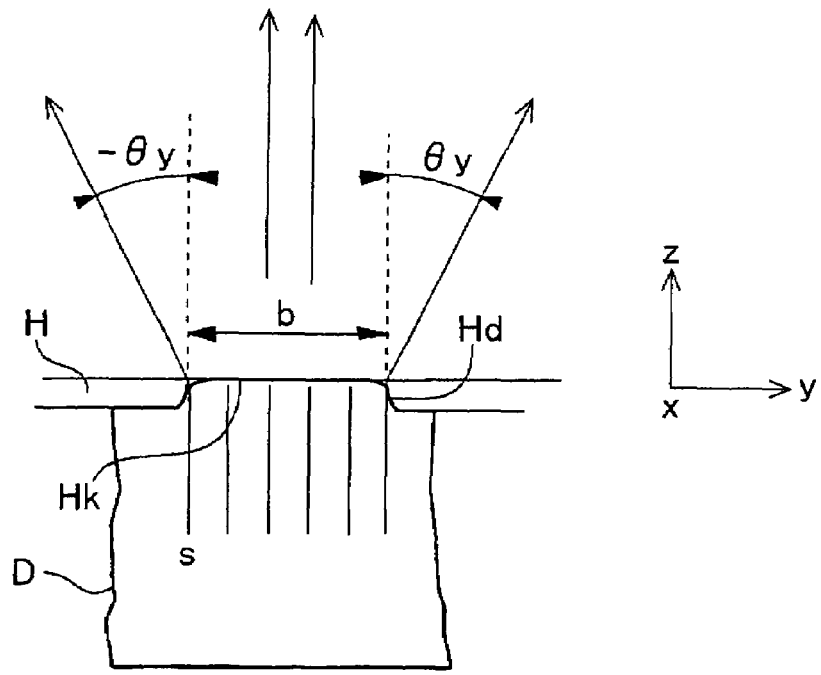
FIG. 19B is an enlarged view of FIG. 19A showing the principle of the light guiding plate shown in FIG. 18B.

In addition, as viewed in the y-z sectional plane as shown in FIG. 19B, the internal light s enters the convex portions Hk of width b perpendicularly, passes through them, and is emitted from a central portion of each convex portion in a substantially perpendicular direction. However, the transmitted light goes around portions close to opposite ends of each convex portion, so that circumvention of the transmitted light occurs.

A value of the circumvention angle θy is expressed by the following equation.

$$\sin \theta y = \pm \lambda/b \qquad (2)$$

Figure 20B:
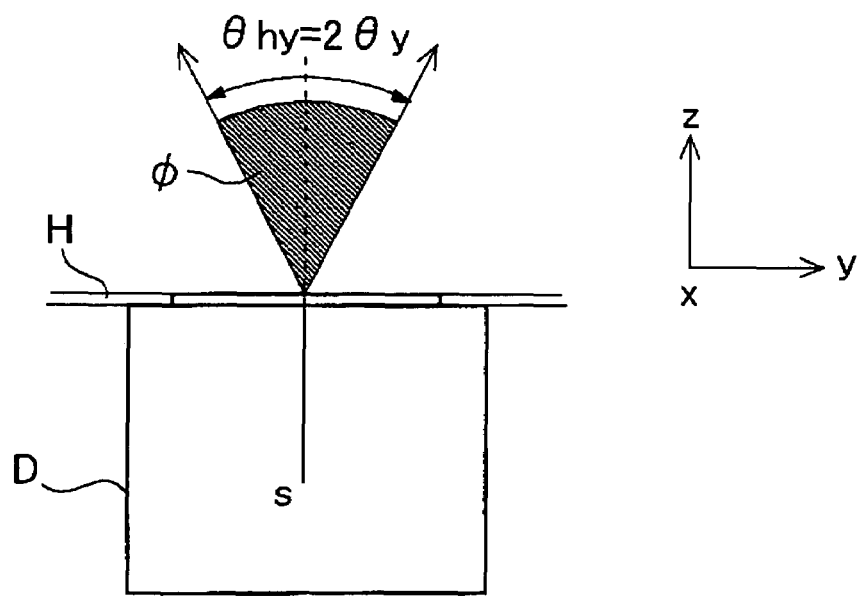
FIG. 20B is an explanatory view of the anisotropic diffusion light emitted from the anisotropic diffusing surface of the light guiding plate shown in FIG. 18B.

Consequently, it is evident from the equation (2) that the angular width θhy of the diffusion light in the y-z plane shown in macro in FIG. 20B is equal to 2 sin θy and is inversely proportional to the width b of each convex portion Hk in the y-axial direction.

If the angular width θhx of the diffusion light in the x-z plane and the angular width θhy of the diffusion light in the y-z plane are compared and a difference is found between the two, it may be determined that the anisotropic diffusion has occurred.

In the first embodiment, the relation of 2θhx<2θhy is satisfied, as shown in FIGS. 20A and 20B; therefore it is clear that anisotropic diffusion has occurred. Here, if an anisotropic intensity is 2θhy/2θhx, the anisotropic intensity can be increased or decreased to be 1 or more, or 1 or less by appropriately selecting the sizes of d and b of the hologram H formed on the upper surface of the light guiding plate D.

Meanwhile, a C-C sectional surface of the diffusion light in the x-z plane as shown in FIG. 20A has an elongate elliptical shape extending in the y-axial direction perpendicular to the C-C direction.

Next, an anisotropic diffusing surface comprising the hairline diffusing surface formed on a surface of the light guiding plate by use of a mold or the like configured to approximate a surface shape of the surface relief type-phase hologram to a configuration of a plurality of prismatic arrays as shown in FIG. 18B without using the photograph technology of the hologram as mentioned above is explained.

Figure 21:
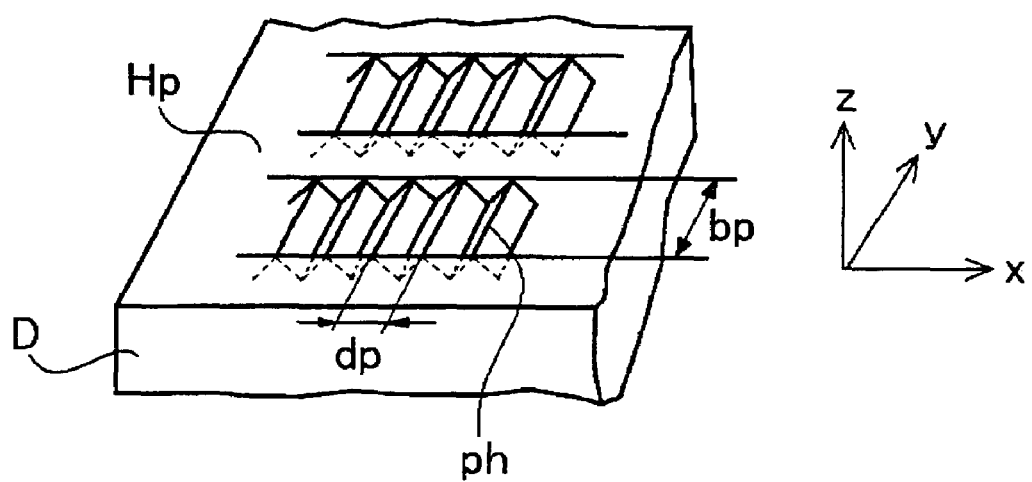
FIG. 21 is an explanatory view showing a structure of a hairline anisotropic diffusing surface used for the planar light source unit according to the present invention.
Figure 22A:
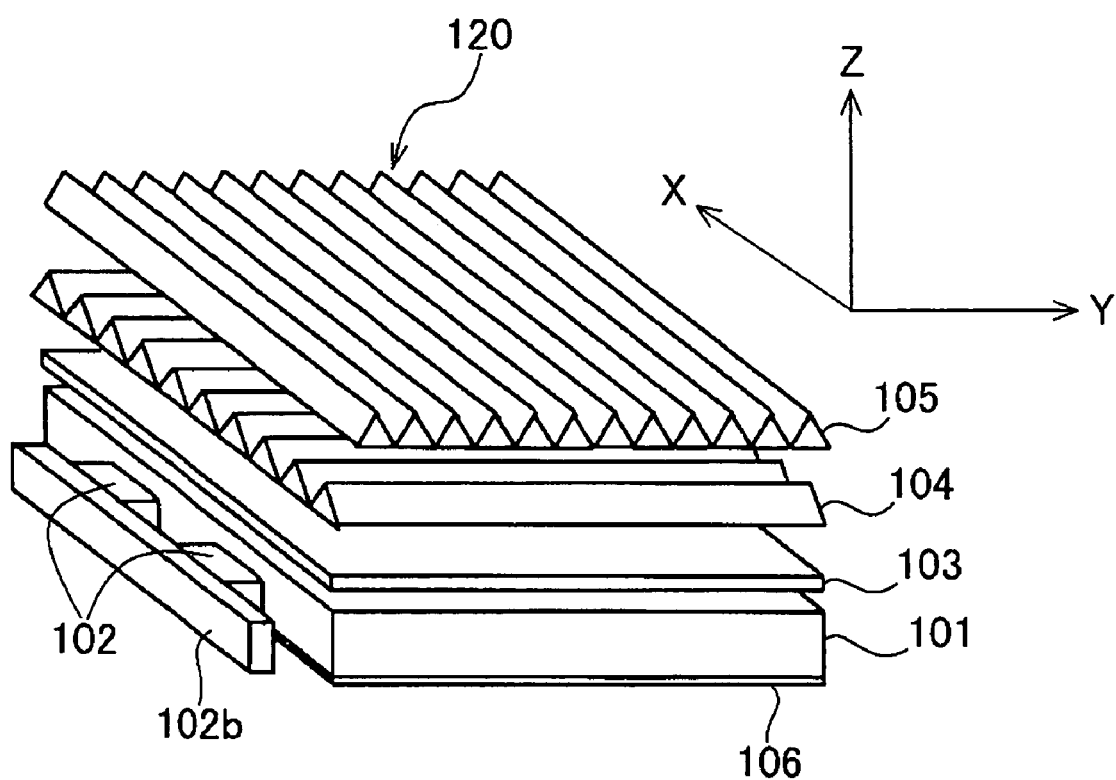
FIG. 22A is a perspective view showing a structure of a conventional planar light source unit.
Figure 22B:
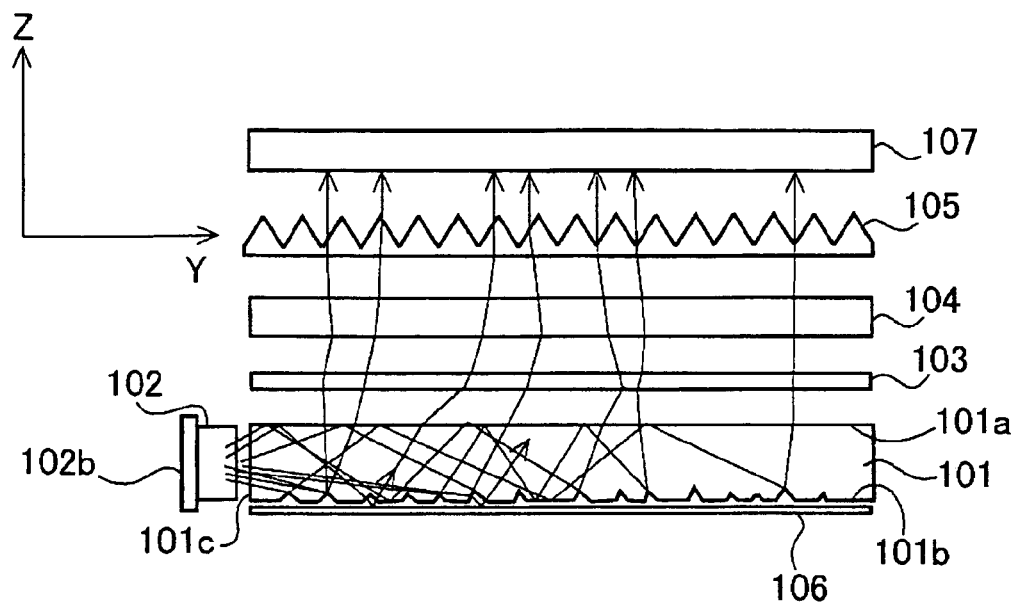
FIG. 22B is a side view showing a state of an LCD panel illuminated by the planar light source unit shown in FIG. 22A.
Figure 22C:
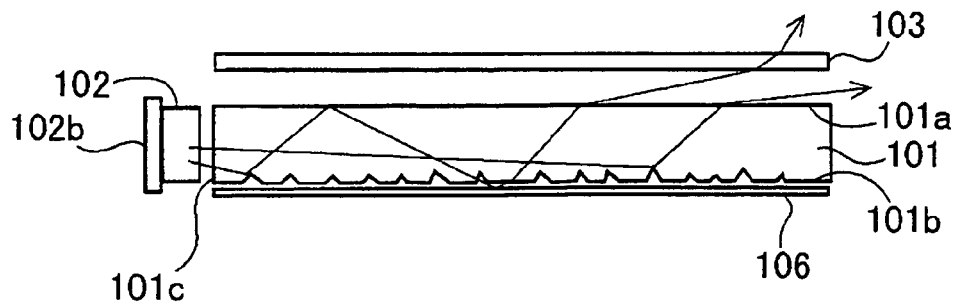
FIG. 22C is a side view explaining a light path of the planar light source unit shown in FIG. 22A.

FIG. 21 illustrates the light guiding plate including the anisotropic diffusing surface comprising the hairline diffusing surface.

As shown in FIG. 21, the hairline diffusing surface Hp is formed on the surface of the light guiding plate D. The hairline diffusing surface Hp includes a plurality of prismatic arrays each having minute prisms ph disposed in the x-axial direction. An interval or pitch dp between the prisms ph and a width bp of each of the prisms ph are set to be equal or close in value to the pitch d between and the width b of each of the convex portions of the hologram diffusing surface H as shown in FIG. 18A, respectively.

Figure 20C:
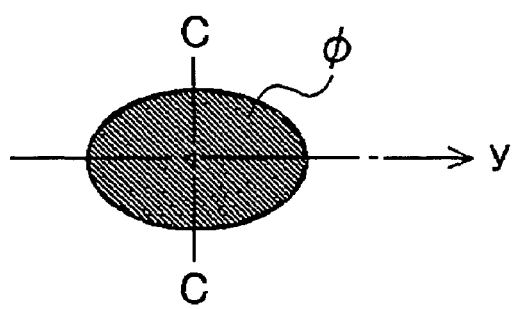
FIG. 20C is a view taken along the C-C line in FIG. 20A.

With such a hairline diffusing surface Hp, it is possible to acquire anisotropic diffusion light that is almost identical to that which can be acquired using a similar principle as in the above-mentioned hologram diffusing surface H (see FIGS. 20A to 20C).

Although an anisotropic diffusing surface comprising a hologram diffusing surface or hairline diffusing surface has been mentioned, the anisotropic diffusing surface is not limited to the above-mentioned structures, and items displaying contrasts in curvature, concavity-convexity, or the like, having an anisotropic diffusing function, such as a plurality of ellipses, parabolas, hyperbolas, or the like, may be used as the anisotropic diffusing surface.

Light emitted from the LEDs 2 enters the incident surface 1c of the light guiding plate 1 and forms the internal light s. The internal light reaches the anisotropic diffusing surface 1h directly or through the reflection of the prismatic surface 1p. The anisotropic diffusion light is emitted upwardly from the anisotropic diffusing surface 1h. In other words, the anisotropic diffusion light φA, φB, and φC is emitted from the first, second and third diffusing surface areas 1hA, 1hB and 1hC, respectively.

The reflective plate 6 reflects the internal light s leaked downwardly from the prismatic surface 1p on the lower surface of the light guiding plate 1, returns it to an inner portion of the light guiding plate 1 and acts to increase the utilization efficiency of the internal light.

Figure 3:
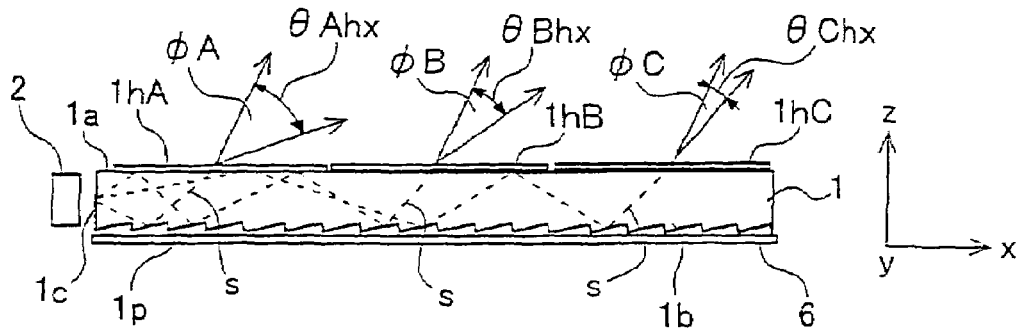
FIG. 3 is a side view showing an emission state of diffusion light in the light guiding plate shown in FIG. 2.
Figure 4A:
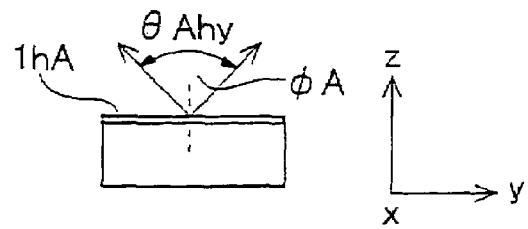
FIG. 4A is a side view showing an emission state of the diffusion light in the light guiding plate shown in FIG. 2.
Figure 4B:
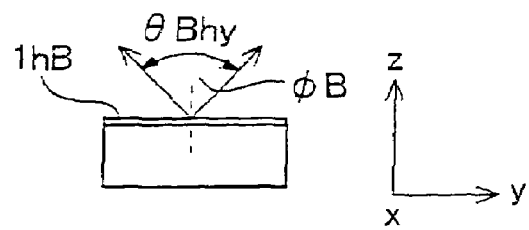
FIG. 4B is a side view showing an emission state of the diffusion light in the light guiding plate shown in FIG. 2.
Figure 4C:
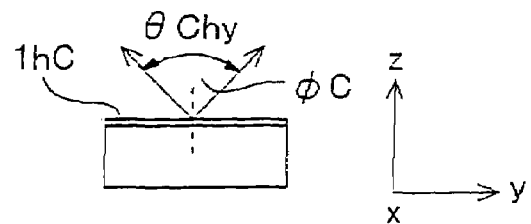
FIG. 4C is a side view showing an emission state of the diffusion light in the light guiding plate shown in FIG. 2.

Here, the angular widths of the diffusion light φA, φB, and φC in the x-z plane are set to be θAhx, θBhx and θChx, respectively, as shown in FIG. 3, and the angular widths of the diffusion light φA, φB, and φC in the y-z plane are set to be θAhy, θBhy and θChy, respectively, as shown in FIGS. 4A, 4B and 4C.

Figure 5:
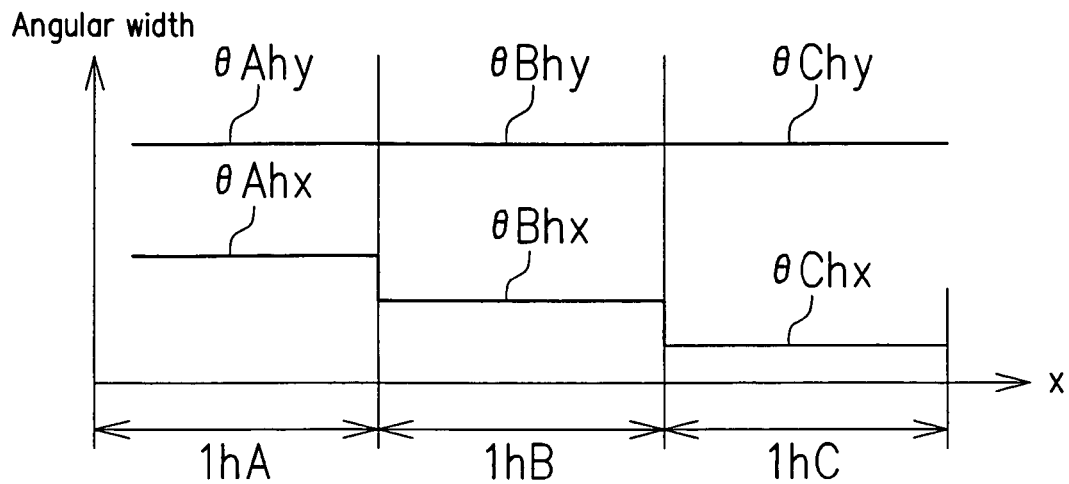
FIG. 5 is a graph showing an angular width of the diffusion light emitted from each diffusing surface area provided on the light guiding plate.

As shown in FIG. 5, the angular widths are determined for each of the diffusing surface areas 1hA, 1hB and 1hC, and the angular widths θAhx, θBhx and θChx of the diffusion light in the x-z plane decrease stepwise or digitally as x (a distance from the incident surface) increases, while the angular widths θAhy, θBhy and θChy of the diffusion lights in the y-z plane do not vary.

Here, considering an anisotropic intensity of each diffusion light as a small and large ration of the angular widths in the x-z plane and the angular widths in the y-z plane, if the anisotropic intensities of the diffusion lights φA, φB, and φC are FA, FB and FC, respectively, the intensities are determined for each of the diffusing surface areas 1hA, 1hB and 1hC and the following equation is satisfied.

$$FA = \theta Ahy/\theta Ahx$$

$$FB = \theta Bhy/\theta Bhx$$

$$FC = \theta Chy/\theta Chx \quad (3)$$

Here, the following equations are satisfied as shown in FIG. 5, $$\theta Ahy = \theta Bhy = \theta Chy \quad (4)$$

$$\theta Ahx > \theta Bhx > \theta Chx \quad (5)$$

From the equations (3), (4) and (5), the following relation is obtained.

$$FA < FB < FC \quad (6)$$

Figure 6:
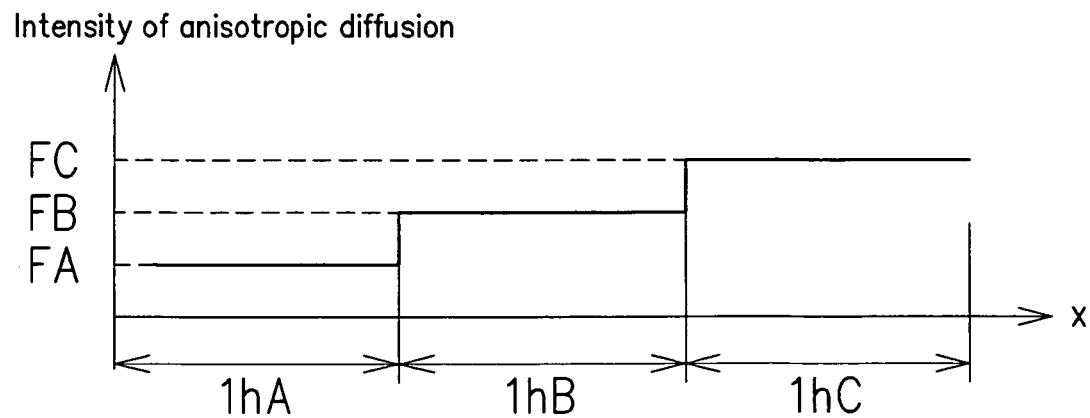
FIG. 6 is a graph showing anisotropic intensity of the diffusion light emitted from each of the diffusing surface areas provided on the light guiding plate.

Therefore, the anisotropic intensity of each diffusion light is increased stepwise for each of the diffusing surface areas 1hA, 1hB and 1hC, as shown in FIG. 6.

Figure 7:
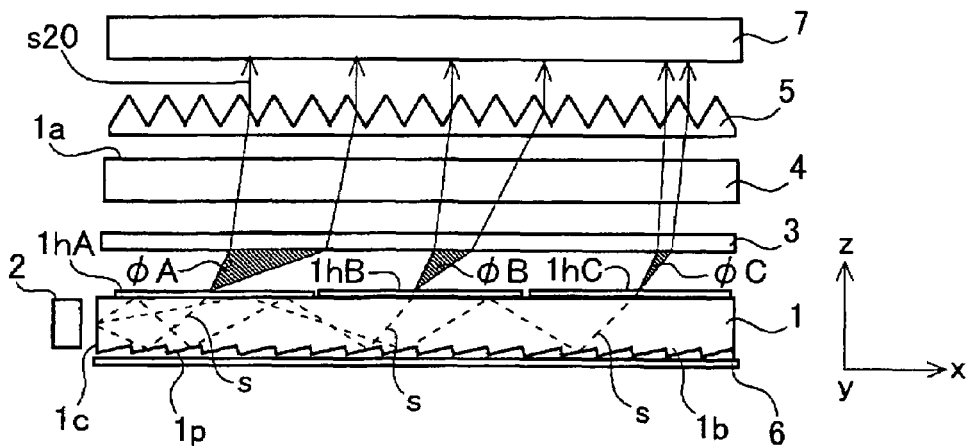
FIG. 7 is a side view showing a state of an LCD panel illuminated by the planar light source unit shown in FIG. 1.

Here, FIG. 7 illustrates operation of the planar light source unit 20 as shown in FIG. 1.

As shown in FIG. 7, exit directions of the anisotropic diffusion light φA, φB, and φC emitted from the light guiding plate 1 are lined up perpendicularly through the diffusion plate 3, the Px prismatic sheet 4, and the Py prismatic sheet 5, sequentially, and this light enters the LCD panel 7 as illumination light s20 to illuminate the LCD panel 7. In this case, if conversion efficiencies from the diffusion light φA, φB, and φC to the illumination light s20 are ηA, ηB and ηC, respectively, then the following relation exists between them.

$$\eta A < \eta B < \eta C \quad (7)$$

This is because diffusion light having a large exit angle increases to have low conversion efficiency, if the angular width, for example, θAhx in the x-z plane is large, and diffusion light having a large exit angle decreases to have high conversion efficiency, if the angular width, for example, θChx in the x-z plane is small.

Figure 8:
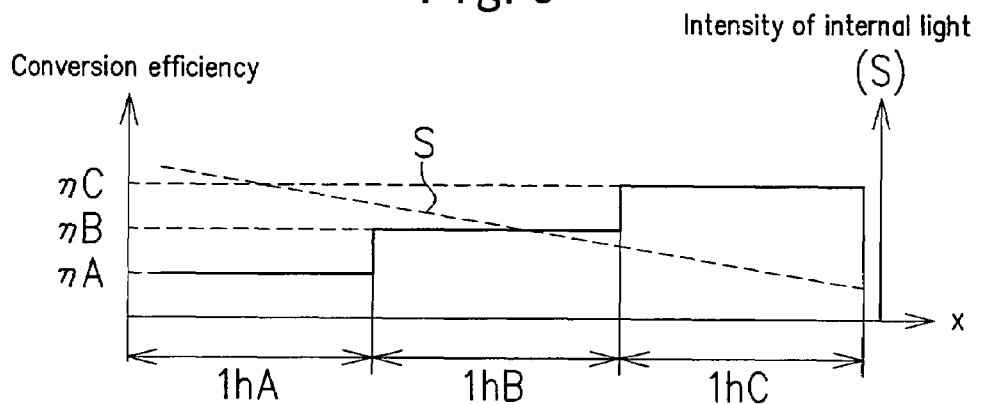
FIG. 8 is a graph showing conversion efficiency of the diffusion light in each diffusing surface area.

FIG. 8 illustrates a change of the conversion efficiency corresponding to the equation (7), as shown by a solid line.

Character S shown by a dotted line in FIG. 8 shows an intensity of the internal light s in the light guiding plate 1. The intensity S of the internal light s tends to decrease as x increases by the already mentioned principle.

Figure 9:
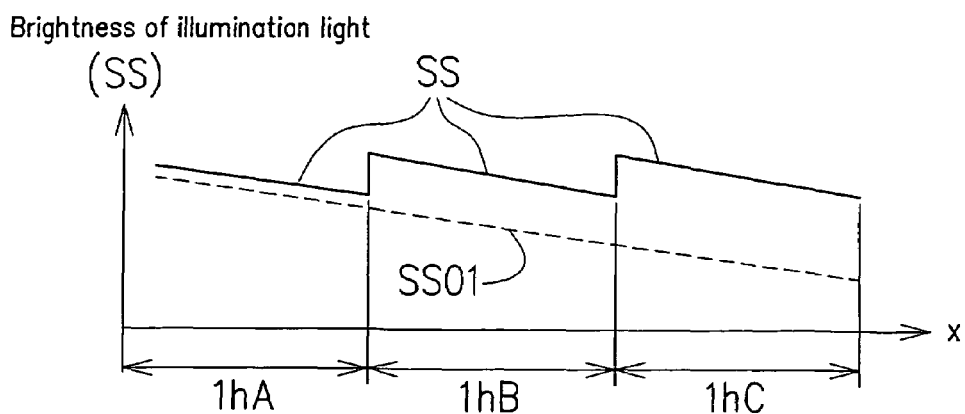
FIG. 9 is a graph showing illumination light brightness of the diffusion light in each diffusing surface area.

Here, if a brightness or intensity of each illumination light s20 (FIG. 7) is SS, a distribution of the brightness SS of each illumination light is as shown in FIG. 9. This is because the brightness SS of each illumination light depends on the product of each of the conversion efficiencies ηA, ηB and ηC, as shown in FIGS. 4A, 4B and 4C, and the intensity S of the internal light.

Figure 23A:
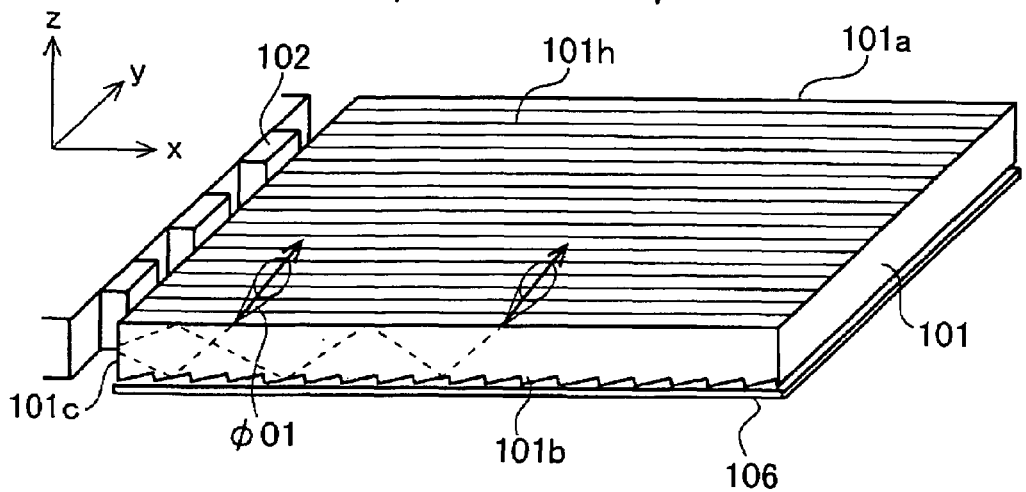
FIG. 23A is a perspective view showing a conventional light guiding plate using an anisotropic diffusion.
Figure 23B:
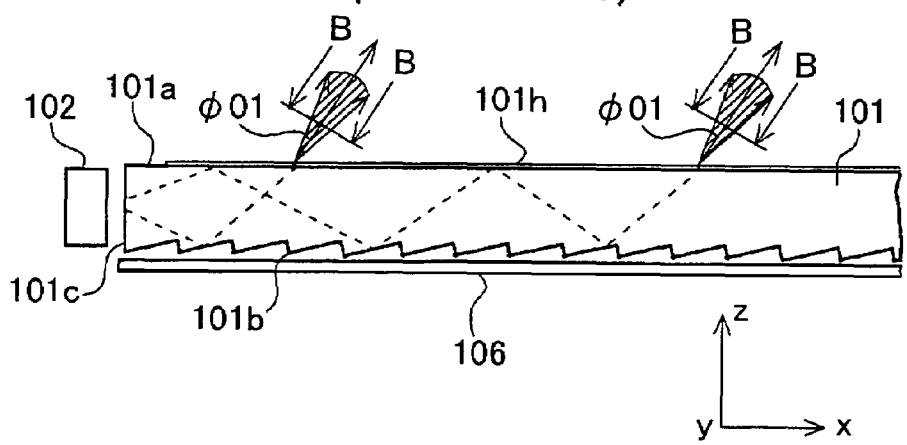
FIG. 23B is a side view showing an emission state of anisotropic diffusion light from the light guiding plate shown in FIG. 23A.
Figure 23C:
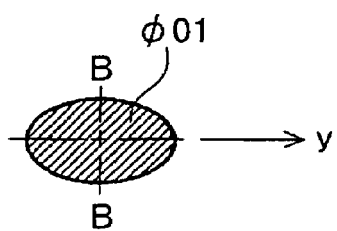
FIG. 23C is a view taken along the B-B line of the anisotropic diffusion light in FIG. 23B.

The brightness SS of the illumination light is shown by a saw tooth-like line as shown in FIG. 9, while averages for each of the diffusing surface areas 1hA, 1hB and 1hC are equal. Here, if the illumination light intensity of the conventional anisotropic diffusion light φ01 (anisotropic intensity is constant) of FIG. 23B is shown as a reference value SS01 by a dotted line, this SS01 decreases in an analog way as x increases, for the reason already mentioned.

As shown in FIG. 9, the brightness SS of the illumination light in the first embodiment has a higher level, reduced variations in brightness, reduced variation width of brightness and higher quality of illumination, in comparison with the conventional technology.

In this way, in the first embodiment, the high quality of illumination can be accomplished by giving the digital gradation to the anisotropic diffusion light intensity, as shown in FIG. 6. Here, giving the gradation to the anisotropic diffusion light intensity, as shown in the first embodiment, can be achieved through the principles of equations (1) and (2) by forming the anisotropic diffusing surface 1h, for example, as the hologram H shown in FIG. 18B, increasing stepwise the interval d between the convex portions Hk as the first, second and third diffusing surface areas 1hA, 1hB and 1hC, and setting the widths b of the convex portions Hk (length in the y-axial direction) to be substantially equal in their first, second and third diffusing surface areas 1hA, 1hB and 1hC.

This can also be basically accomplished by the same principle even in the case that the hairline diffusing surface Hp as shown in FIG. 21 is used.

Next, a second embodiment of the present invention is explained.

Figure 10:
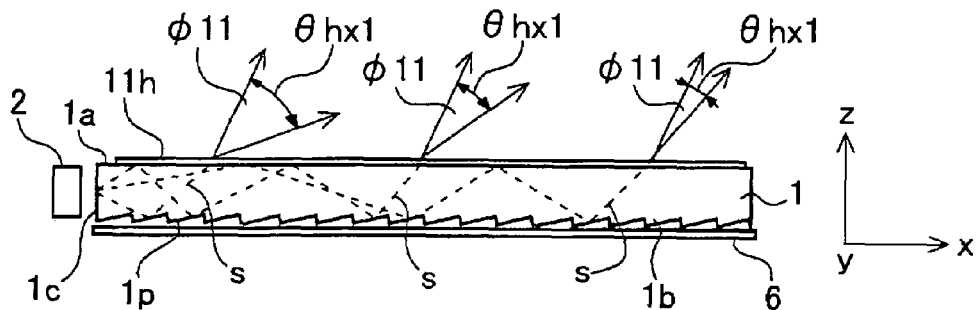
FIG. 10 is a perspective view showing a structure of a light guiding plate used for a planar light source unit according to a second embodiment of the present invention.

FIGS. 10 to 13 illustrate a light guiding plate and an anisotropic diffusing surface provided on the light guiding plate, which are used for a planar light source unit according to the second embodiment. The light guiding plate 1 is the same in shape as that in FIG. 2. As shown in FIG. 10, the anisotropic diffusing surface 11h is provided integrally on an upper surface 1a of the light guiding plate 1.

In other respects the structure of the planar light source unit according to the second embodiment is the same as for the planar light source unit 20 shown in FIG. 1.

Figure 11:
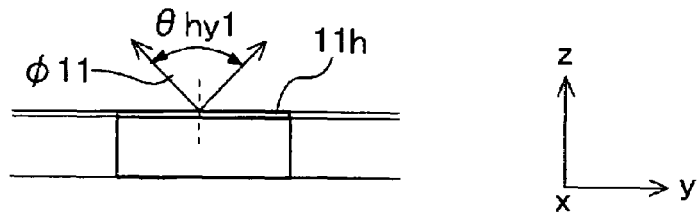
FIG. 11 is an explanatory view showing an exit angle of diffusion light in the light guiding plate shown in FIG. 10.

As shown in FIGS. 10 and 11, anisotropic diffusion light φ11 is emitted from the anisotropic diffusing surface 11h. Here, an angular width of the diffusion light φ11 in the x-z plane and an angular width of the diffusion light φ11 in the y-z plane are set to be θhx1 and θhy1, respectively.

Figure 12:
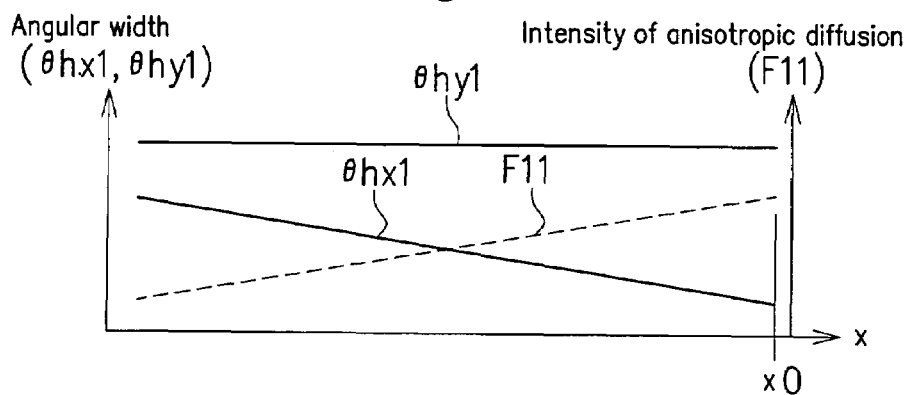
FIG. 12 is a graph showing an angular width of the exit angle of the diffusion light in the light guiding plate shown in FIG. 10.

Throughout the entire light guiding plate 1, the angular widths θhx1 and θhy1 per x (distance from an incident surface 1c) are shown in FIG. 12. Here, x0 is a length of the light guiding plate 1 in the x-axial direction.

As shown in FIG. 12, the angular width θhy1 in the y-z plane does not vary even if x varies, while the angular width θhx1 in the x-z plane is reduced in an analog way as x increases. Giving the characteristics of such angular widths θhx1 and θhx1 can be achieved through the principles expressed in equations (1) and (2) by forming the anisotropic diffusing surface 11h to have, for example, a hologram H shown in FIG. 18B, increasing the interval or pitch d between the adjacent convex portions Hk in an analog way as x increases, and setting the width b (length in the y-axial direction) of each of the convex portions Hk to be substantially equal even if x varies.

This can also be basically accomplished by the same principle even in the case that the hairline diffusing surface Hp as shown in FIG. 21 is used.

Figure 13:
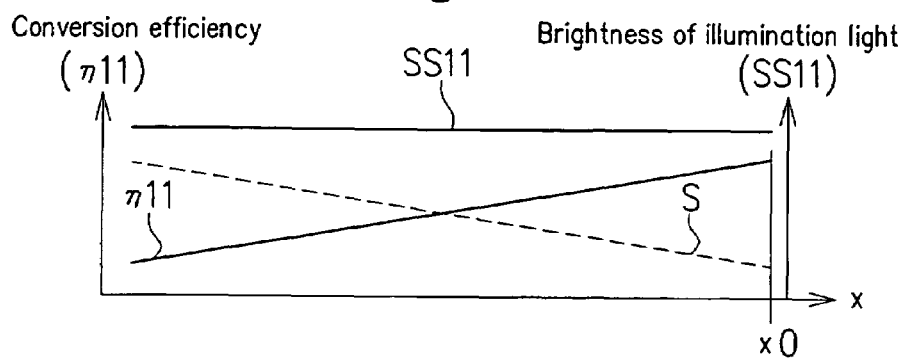
FIG. 13 is a graph showing conversion efficiency of the diffusion light in the light guiding plate shown in FIG. 10.

Consequently, if intensity (θhy1/θhx1) of the anisotropic diffusion light on the anisotropic diffusing surface 11h is F11, this F11 is increases in an analog way as shown by a dotted upward-sloping line in FIG. 12. In other words, the anisotropic diffusion light intensity varies stepwise (analog variation) as shown by the upward-sloping line. On the other hand, if conversion efficiency of the diffusion light φ11 to illumination light is η11, the conversion efficiency becomes larger as the angular width reduces, as mentioned already in the first embodiment, but in the second embodiment, because the angular width θhx1 varies in an analog way as shown by a downward-sloping line in FIG. 12, the conversion efficiency η11 varies in an analog way as shown by an upward-sloping line in FIG. 13. In addition, the intensity S of the internal light s shown by a dotted line varies in an analog way as shown by a downward-sloping line as already mentioned. Therefore, if brightness of the illumination light of the planar light source unit is SS11, this SS11 depending on the product of the conversion efficiency η11 and the intensity S of the internal light has a characteristic of a flat high level as shown in FIG. 13.

Accordingly, in the planar light source unit in the second embodiment, it is possible to emit the illumination light having a high level of brightness and excellent uniformity of brightness, and accomplish increased quality of the illumination light. In this way, in the second embodiment, it is possible to provide the high level of brightness and the uniformity of brightness of the illumination light by giving the analog gradation to the anisotropic diffusion light intensity F11, as shown in FIG. 12.

Hereinafter, a third embodiment of the present invention is explained.

FIGS. 14 to 17D illustrate a light guiding plate and an anisotropic diffusing surface, which are used for a planar light source unit according to the third embodiment of the present invention.

Figure 14:
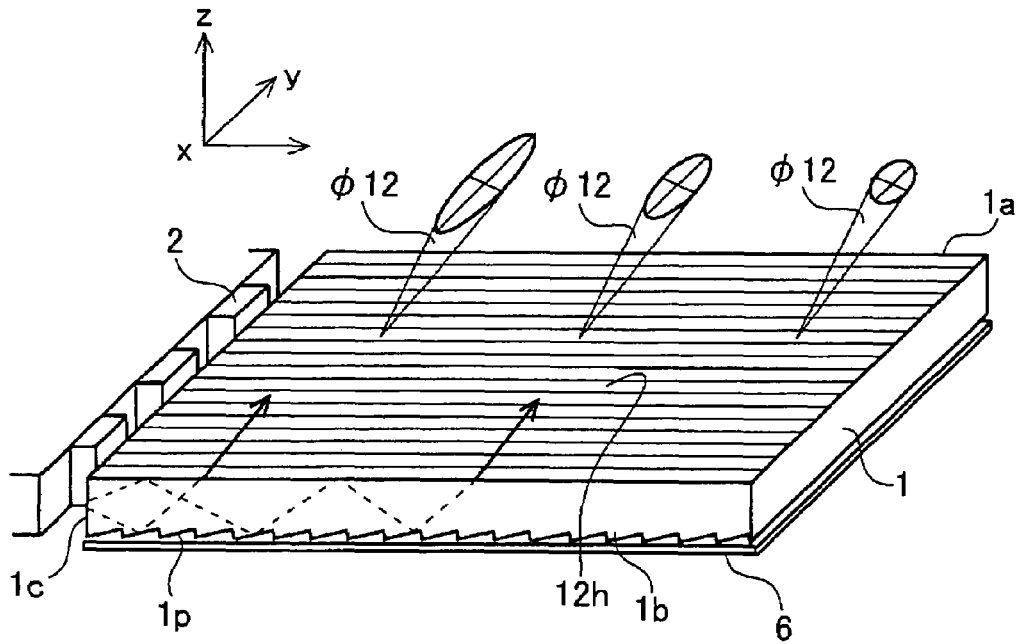
FIG. 14 is a perspective view showing a structure of a light guiding plate used for a planar light source unit according to a third embodiment of the present invention.
Figure 15:
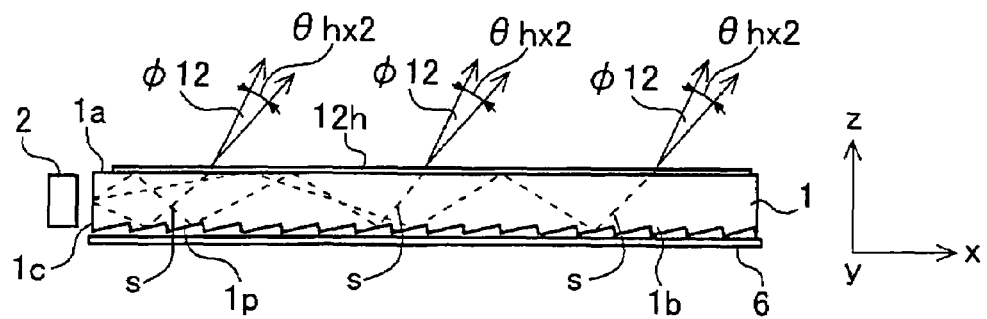
FIG. 15 is a side view showing diffusion light emitted from the light guiding plate shown in FIG. 14, as viewed from one direction of the light guiding plate.

The light guiding plate 1 is the same in shape as that in FIG. 2. As shown in FIGS. 14 and 15, the anisotropic diffusing surface 12h is provided integrally on an upper surface 1a of the light guiding plate 1.

In other respects the structure of the planar light source unit according to the third embodiment is the same as for the planar light source unit 20 shown in FIG. 1.

Figure 16A:
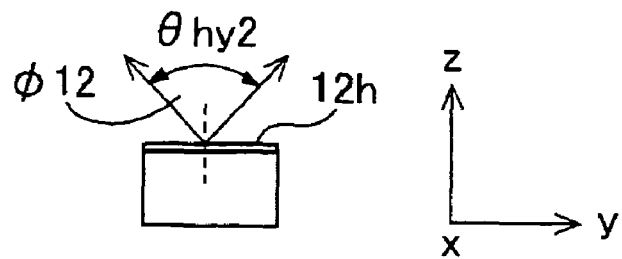
FIG. 16A is a side view showing diffusion light emitted from each diffusing surface area of the light guiding plate shown in FIG. 14, as viewed from the other direction of the light guiding plate.
Figure 16B:
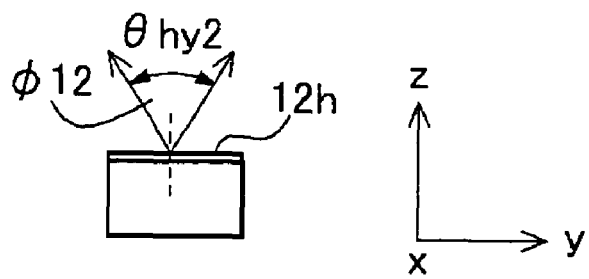
FIG. 16B is a side view showing diffusion light emitted from the light guiding plate shown in FIG. 14, as viewed from the other direction of the light guiding plate.
Figure 16C:
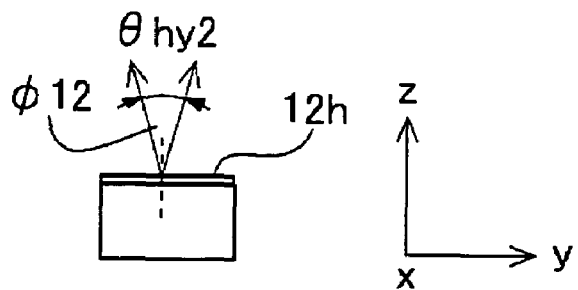
FIG. 16C is a side view showing diffusion light emitted from the light guiding plate shown in FIG. 14, as viewed from the other direction of the light guiding plate.

As shown in FIGS. 14 and 15, anisotropic diffusion light φ12 is emitted from the anisotropic diffusing surface 12h. Here, an angular width of the diffusion light φ12 in the x-z plane as shown in FIG. 15 and an angular width of the diffusion light φ12 in the y-z plane as shown in FIGS. 16A to 16C are set to be θhx2 and θhy2, respectively.

Figure 17A:
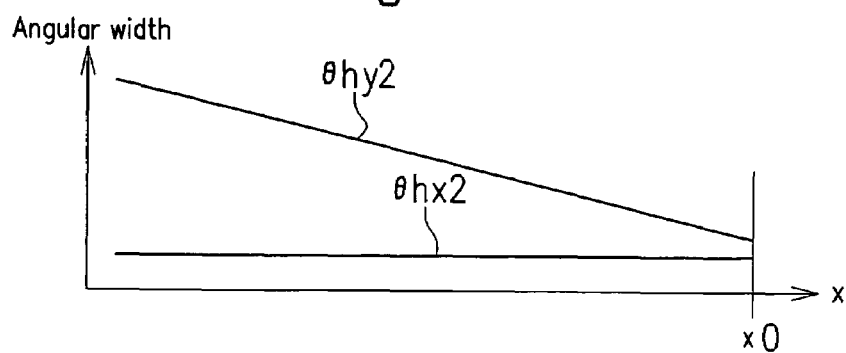
FIG. 17A is a graph showing an angular width of the diffusion light emitted from each of the diffusing surface areas of the light guiding plate shown in FIG. 14.
Figure 17B:
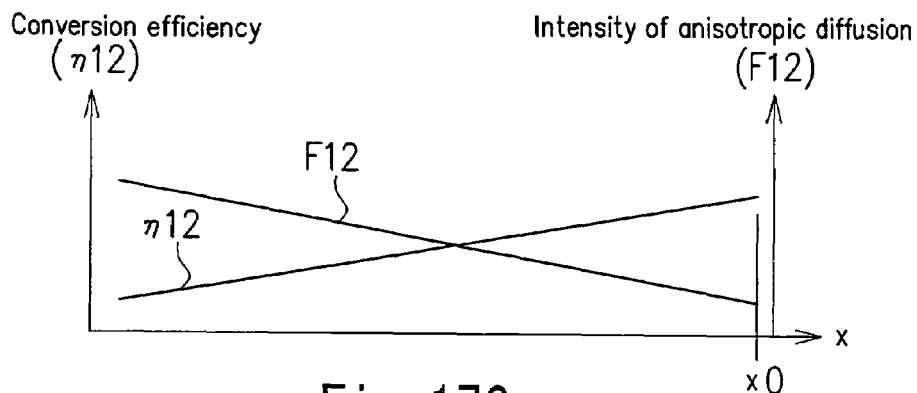
FIG. 17B is a graph showing conversion efficiency of the diffusion light emitted from each of the diffusing surface areas of the light guiding plate shown in FIG. 14.
Figure 17C:
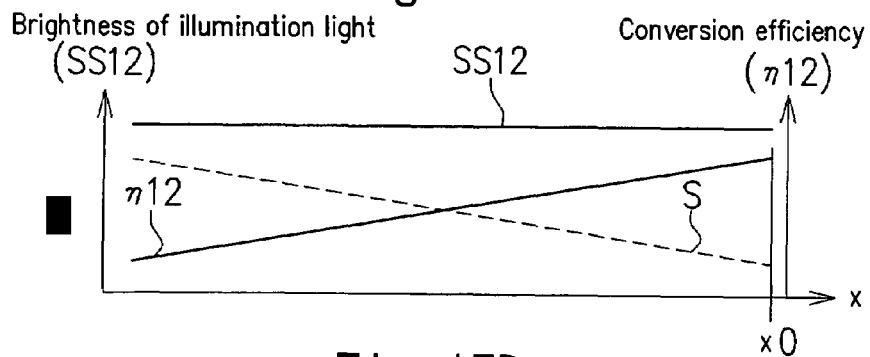
FIG. 17C is a graph showing illumination light brightness of the diffusion light emitted from each of the diffusing surface areas of the light guiding plate shown in FIG. 14.
Figure 17D:
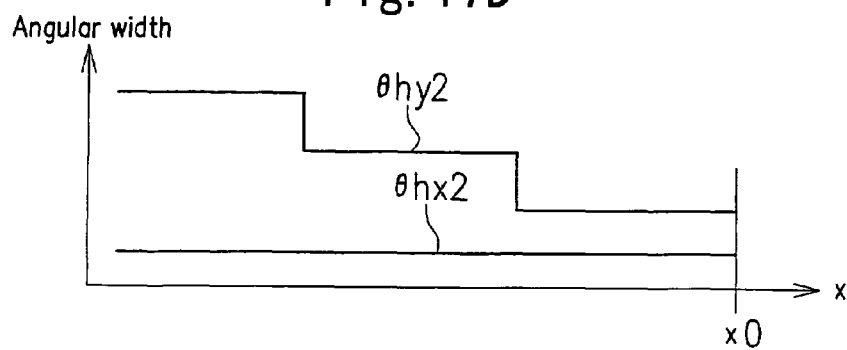
FIG. 17D is a graph showing an angular width of the diffusion light emitted from each of the diffusing surface areas of the light guiding plate shown in FIG. 14.

Throughout the entire light guiding plate 1, the angular widths θhx2 and θhy2 per horizontal axis x (distance from an incident surface 1c) are shown in FIGS. 17A and 17D. Here, x0 shows a length of the light guiding plate 1 in the x-axial direction.

As shown in FIG. 17A, the angular width θhx2 in the x-z plane does not vary even if x increases, while the angular width θhy2 in the y-z plane is reduced in an analog or stepwise way as shown by a downward-sloping line as x increases. Throughout the whole light guiding plate, the angular width θhy2 is larger than the angular width θhx2. The formation of characteristics of such angular widths θhx2 and θhy2 can be accomplished through the principles expressed in equations (1) and (2) by providing the anisotropic diffusing surface 12h to have, for example, the hologram H as shown in FIG. 18B, keeping a regular interval or pitch d between the adjacent convex portions Hk irrespective of x, and increasing the width b (length in the y-axial direction) of each of the convex portions Hk in an analog way as x increases.

This can also be basically accomplished by the same principle even in the case that the hairline diffusing surface Hp as shown in FIG. 21 is used.

Here, if the intensity of the anisotropic diffusion light in this case is F12, this F12 is expressed by the following equation.

$$F12 = \theta hy2 / \theta hx2$$

Because the angular width θhx2 is constant, as shown in FIG. 17A, the F12 is proportional to the angular widths θhy2.

Consequently, the anisotropic diffusion light intensity F12 varies in an analog way as shown by a downward-sloping line in FIG. 17B. On the other hand, if conversion efficiency of the diffusion light φ12 (see FIG. 14) to illumination light is η12, the conversion efficiency is inversely proportional to the angular width, as already mentioned. In addition, because the angular width θhy2 is reduced in an analog way as x increases as shown in FIG. 17A, the conversion efficiency η12 varies in an analog way as shown by an upward-sloping line in FIG. 17B.

Next, if brightness of the illumination light of the planar light source unit according to the third embodiment is SS12, this brightness SS12 has a generally constant flat characteristic as shown in FIG. 17C. This is for the following reason. The conversion efficiency η12 is inversely proportional to the intensity S of the internal light in the light guiding plate as shown in FIG. 17C, so that the brightness SS12 which depends on the product of the conversion efficiency η12 and the intensity S of the internal light come to have a generally flat characteristic.

In this way, even in the third embodiment, high quality of the illumination light can be accomplished by giving the analog gradation to the anisotropic diffusion light intensity F12, as shown in FIG. 17B.

As a modified example of the third embodiment, a constant angular width in the x-z plane can be acquired by reducing the angular width ηhy2 of the anisotropic diffusion light in the y-z plane stepwise (digitally) as x increases, as shown in FIG. 17D. In this case, the conversion efficiency to the illumination light increases stepwise as x increases, which is not shown, and the brightness of the illumination light is similar to the SS shown in FIG. 9, thereby illumination light brightness having a level higher than that in the conventional planar light source can be accomplished and brightness variation is reduced.

In the above-mentioned embodiments, although the case that either the angular width θhx or the like of the anisotropic diffusion light in the x-z plane or angular width θhy or the like of the anisotropic diffusion light in the y-z plane is constant, and the other varies in an analog or digital way has been mentioned, the present invention is not limited to these embodiments. For example, even if both the angular width θhx or the like of the anisotropic diffusion light in the x-z plane and the angular width θhy or the like of the anisotropic diffusion light in the y-z plane vary in accordance with the distance x from the incident surface 1c (see FIG. 3), it is possible to provide high level of brightness and uniformity of brightness of the illumination light, reduced brightness variation, and high quality of the illumination light by giving the proper gradation to the anisotropic diffusion light intensity F12 in accordance with the position within the light guiding plate.

Moreover, in the above-mentioned embodiments, although the anisotropic diffusing surface having the gradation is formed on the upper surface of the light guiding plate, the present invention is not limited to these embodiments. For example, even if the anisotropic diffusing surface having the gradation is provided on the lower surface of the light guiding plate, similar effects can be acquired.

Although the preferred embodiments of the present invention have been mentioned, the present invention is not limited to these embodiments, and various modifications and changes can be made to the embodiments.

What is claimed is:

1. A planar light source unit, comprising:
a light guiding plate including an anisotropic diffusing surface which emits anisotropic diffusion light; and
a light emitting source comprising at least one light emitting diode for supplying light to the light guiding plate,
wherein the anisotropic diffusing surface is formed into a shape configured to give a gradation of the anisotropic diffusion light intensity, which increases stepwise.

2. The planar light source unit according to claim 1,
wherein the anisotropic diffusing surface comprises a hologram diffusing surface which varies in isotropic steps.

3. The planar light source unit according to claim 1,
wherein the anisotropic diffusing surface comprises a hairline diffusing surface including a plurality of prismatic arrays, each of which has a minute prism.

4. The planar light source unit according to claim 1,
wherein the anisotropic diffusing surface has a plurality of diffusing surface areas.

5. The planar light source unit according to claim 4,
wherein the plurality of diffusing surface areas are arranged from a position close to the light emitting source to a position remote from the light emitting source.

6. The planar light source unit according to claim 4,
wherein the plurality of diffusing surface areas are set so that diffusion light emitted from different ones of the diffusing surface areas differs in width, exit angle, anisotropic diffusion light intensity, brightness and conversion efficiency.

* * * * *